(No Model.)  7 Sheets—Sheet 1.
H. AIKEN.
ROLLING MILL.
No. 421,039.  Patented Feb. 11, 1890.
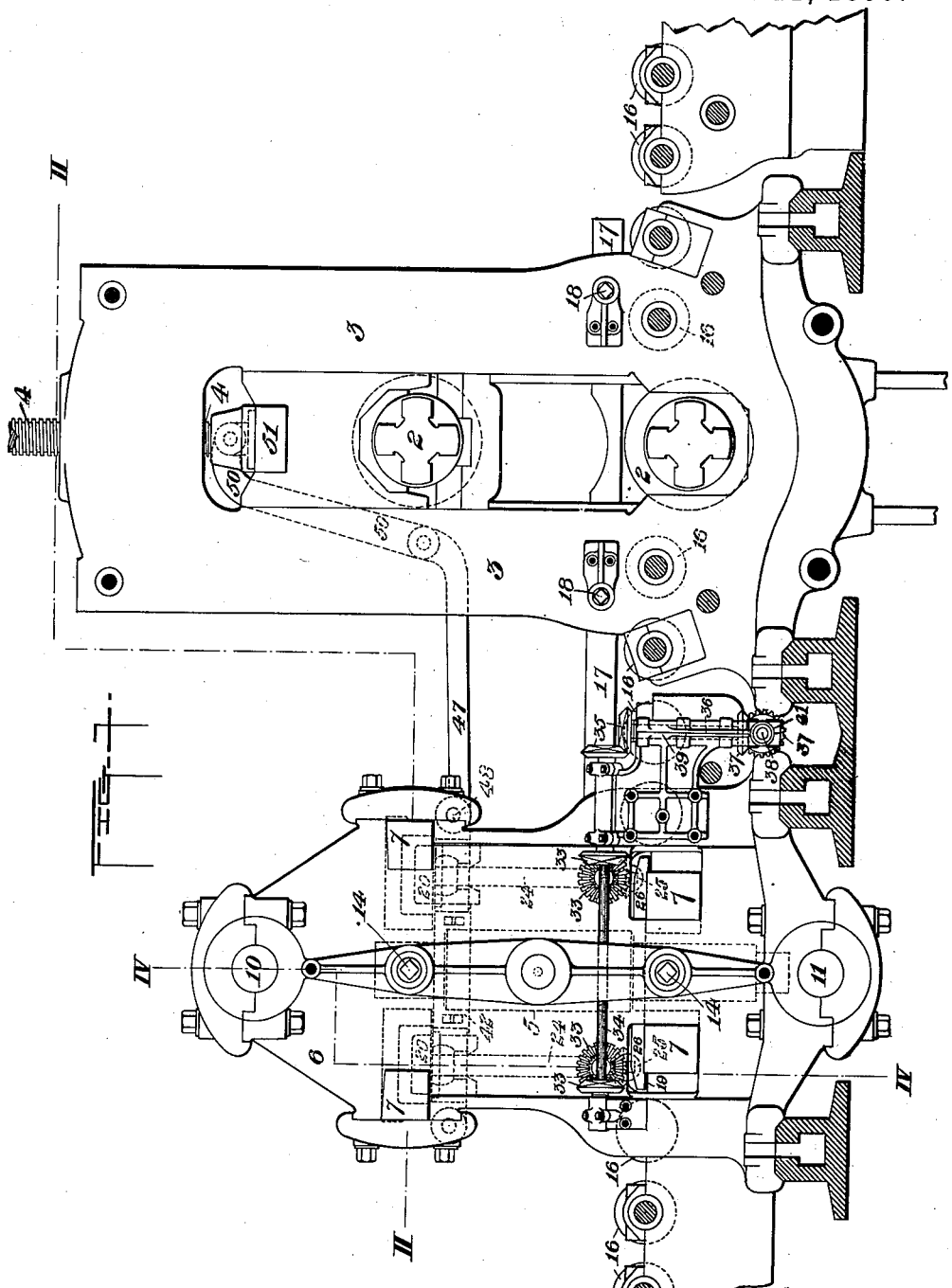
WITNESSES:  INVENTOR, (No Model.) 7 Sheets—Sheet 2.
H. AIKEN.
ROLLING MILL.
No. 421,039. Patented Feb. 11, 1890.
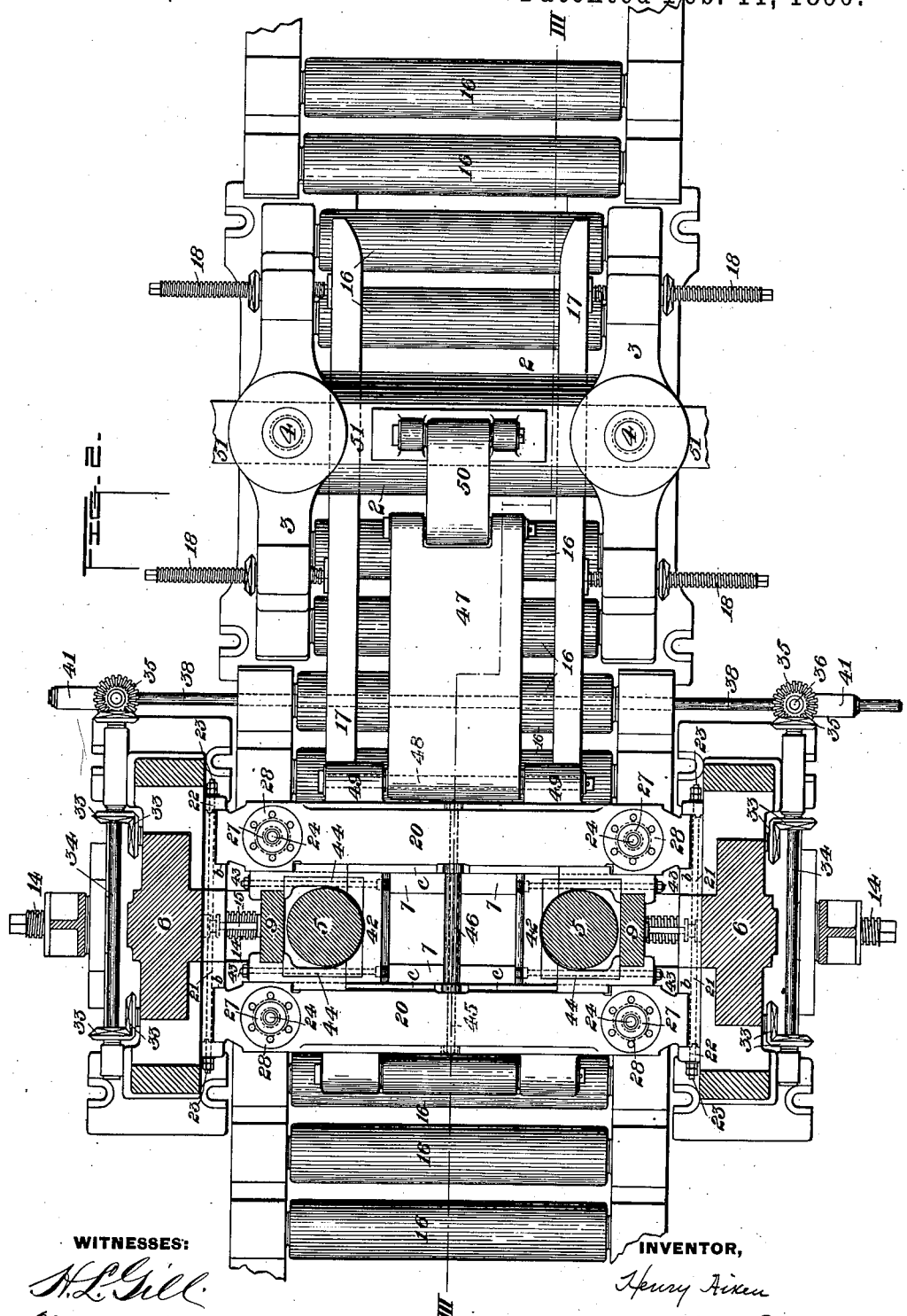
WITNESSES:
INVENTOR,
Henry Aiken
by W. Bakewell & Sons
Att'ys (No Model.) 7 Sheets—Sheet 3.
H. AIKEN.
ROLLING MILL.
No. 421,039. Patented Feb. 11, 1890.
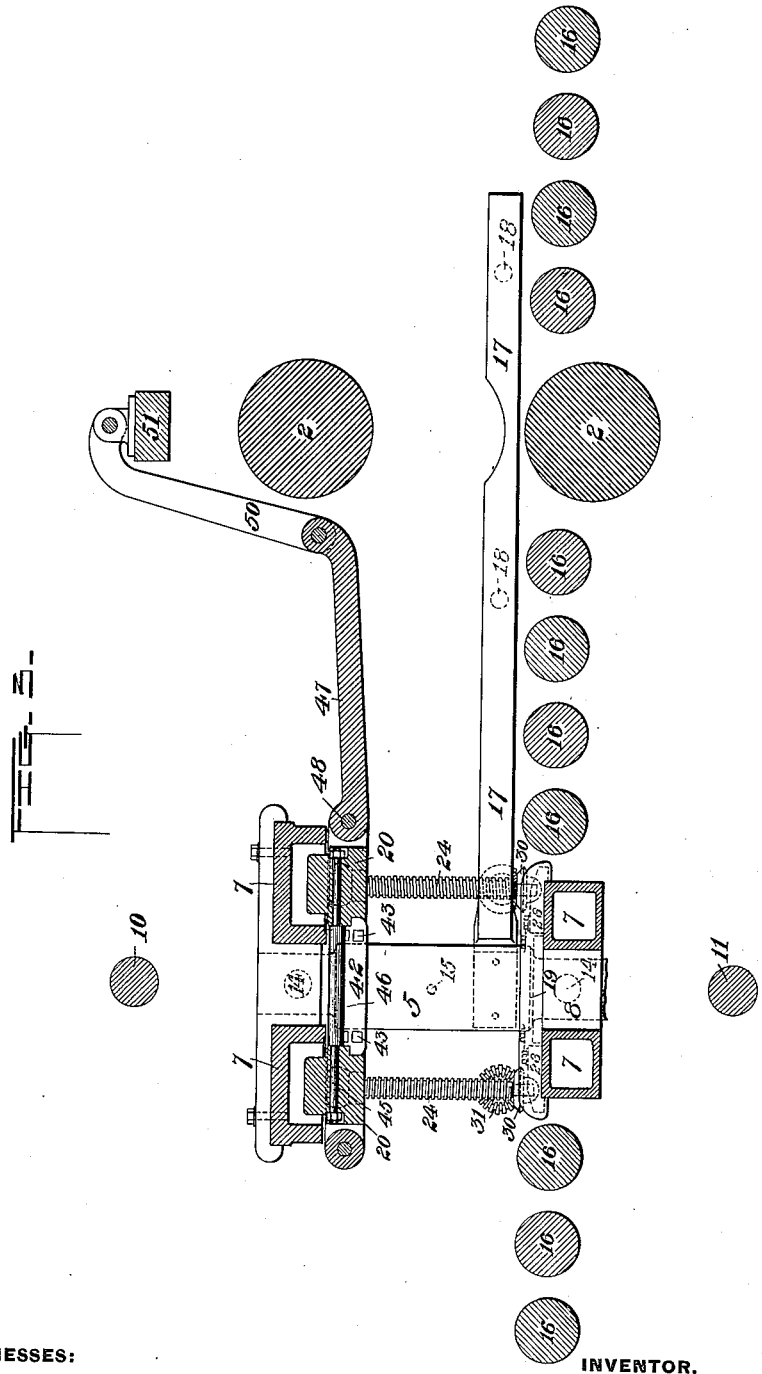
WITNESSES:
INVENTOR,
Henry Aiken
by W. Bakewell & Sons
Att'yS (No Model.) 7 Sheets—Sheet 4.
H. AIKEN.
ROLLING MILL.
No. 421,039. Patented Feb. 11, 1890.
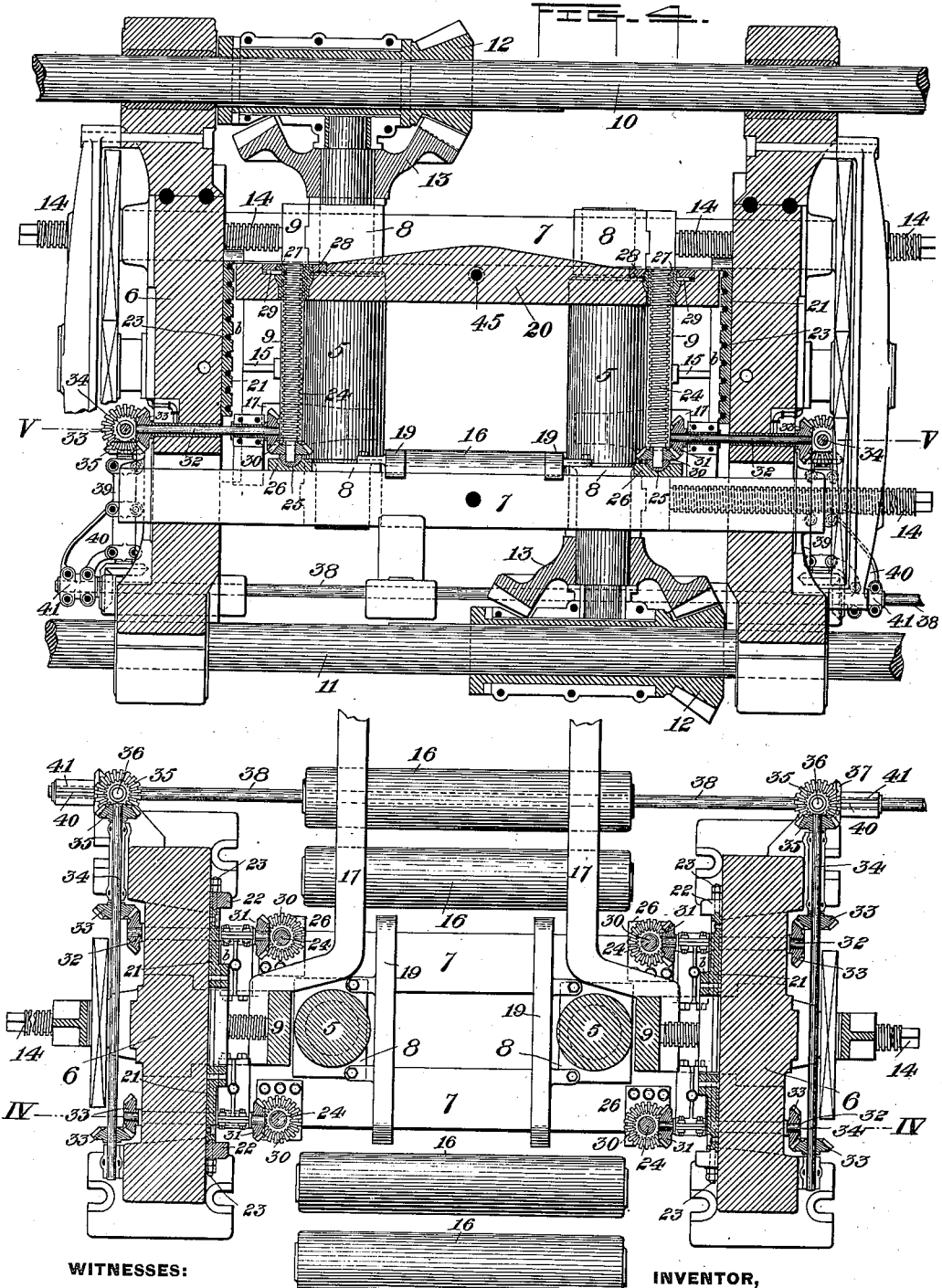
WITNESSES: INVENTOR,
Henry Aiken
by W. Bakewell & Sons
Att'yS.

(No Model.)  7 Sheets—Sheet 5.
H. AIKEN.
ROLLING MILL.
No. 421,039. Patented Feb. 11, 1890.
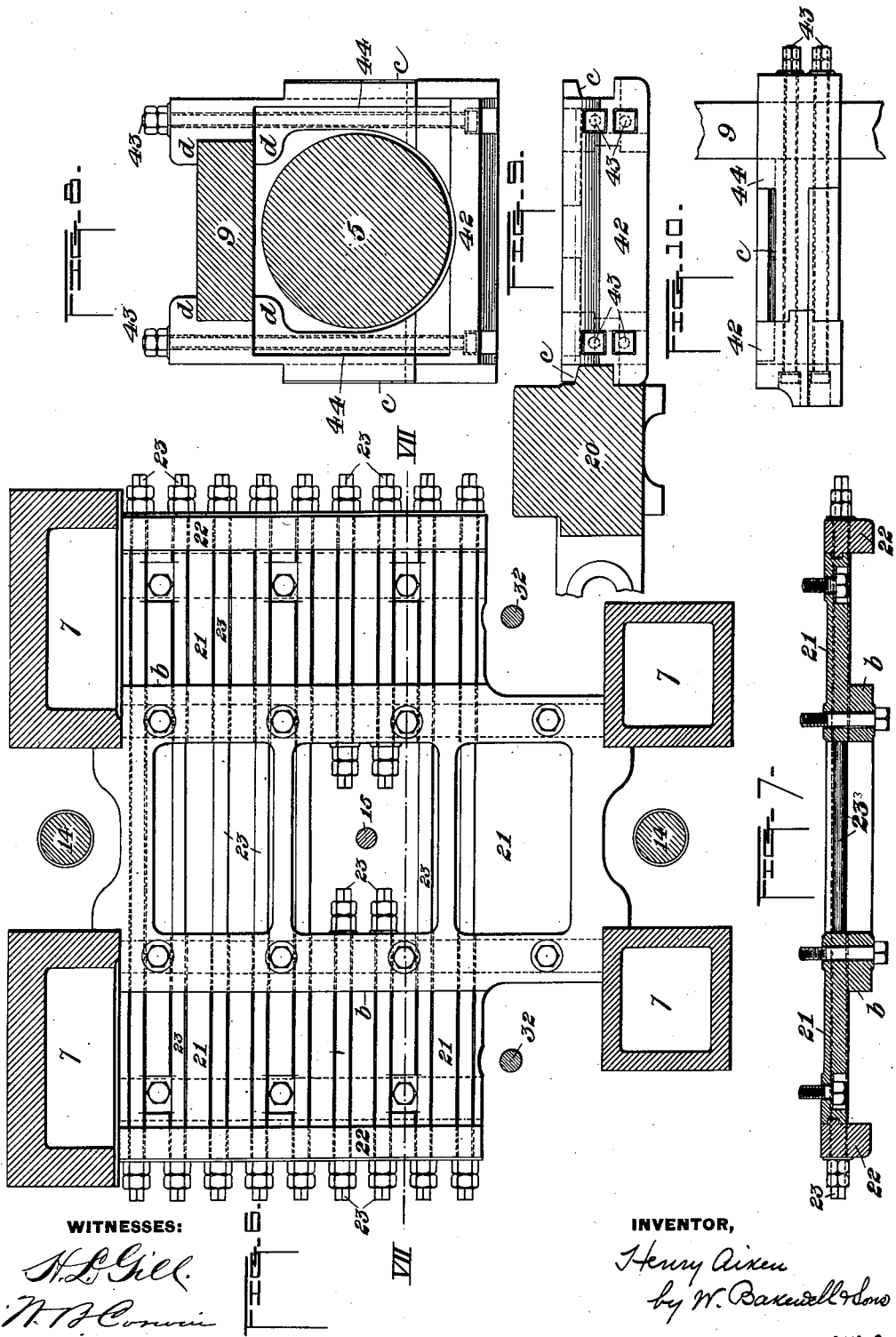
WITNESSES:
INVENTOR,
Henry Aiken
by W. Bakewell & Sons
Att'yS.

(No Model.) 7 Sheets—Sheet 6.
H. AIKEN.
ROLLING MILL.
No. 421,039. Patented Feb. 11, 1890.
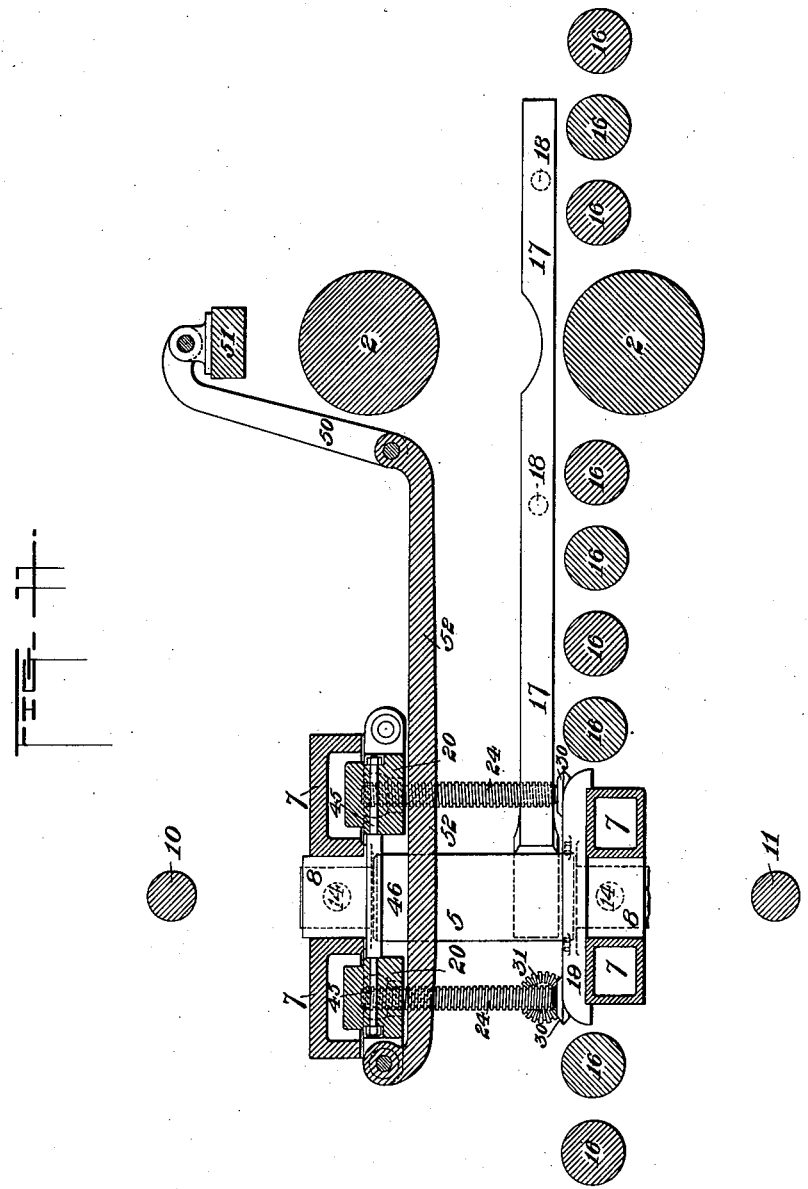
WITNESSES: INVENTOR,
H. L. Gill. Henry Aiken
by W. Bakewell & Sons
Att'ys.

(No Model.) 7 Sheets—Sheet 7.

H. AIKEN.
ROLLING MILL.

No. 421,039. Patented Feb. 11, 1890.

WITNESSES
H. L. Gill.
N. T. Convie

INVENTOR
Henry Aiken
by W. Bakewell & Sons
his Attorneys

UNITED STATES PATENT OFFICE.

HENRY AIKEN, OF HOMESTEAD, PENNSYLVANIA.

ROLLING-MILL.

SPECIFICATION forming part of Letters Patent No. 421,039, dated February 11, 1890.

Application filed October 22, 1889. Serial No. 327,772. (No model.)

*To all whom it may concern:*

Be it known that I, HENRY AIKEN, of Homestead, in the county of Allegheny and State of Pennsylvania, have invented a new and useful Improvement in Rolling-Mills, of which the following is a full, clear, and exact description, reference being had to the accompanying drawings, forming part of this specification, in which—

Figure 12:
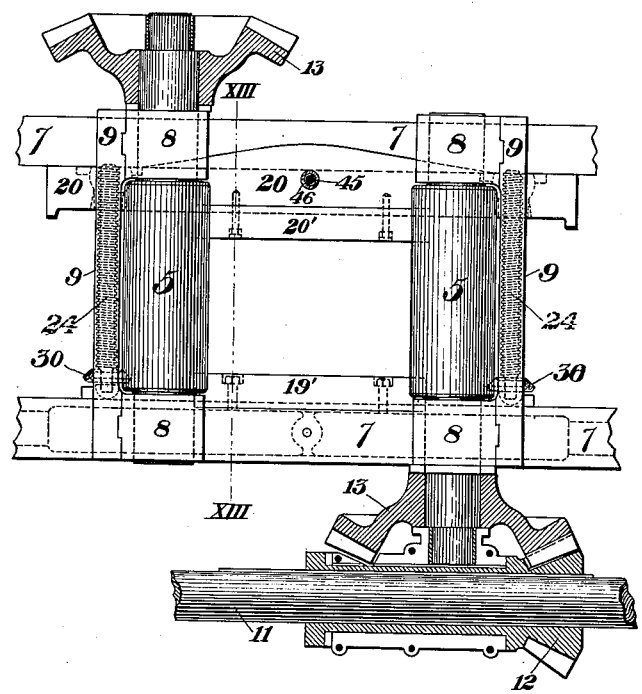
Figure 13:
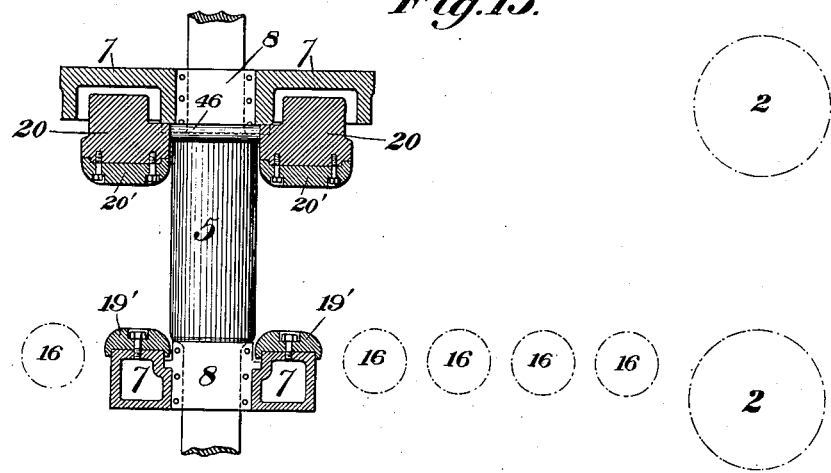

Figure 1 is a side elevation of my improved mill. Fig. 2 is a sectional plan view on the section plane II II of Fig. 1. Fig. 3 is a vertical longitudinal section on the line III III of Fig. 2. Fig. 4 is a vertical irregular section on the line IV IV of Figs. 1 and 5. Fig. 5 is a horizontal section on the line V V of Fig. 4. Fig. 6 is an enlarged view of the plate forming the guide for the rest-bars 20. Fig. 7 is a horizontal cross-section on the line VII VII of Fig. 6. Fig. 8 is an enlarged plan view showing one of the upper guides of the vertical rolls. Fig. 9 is an end view, and Fig. 10 is a side view, thereof. Fig. 11 is a view similar to Fig. 3, showing a modified form of the upper guides of the vertical rolls. Fig. 12 is a partial front elevation, partly in section showing another modified construction of the guides. Fig. 13 is a vertical cross-section on the line XIII XIII of Fig. 12.

Like symbols of reference indicate like parts in each.

The universal mill shown in the accompanying drawings is in many respects similar to the mill shown and described in a prior application filed by Henry Aiken and Julian Kennedy on March 16, 1888, Serial No. 267,405, and to the specification and drawings of that application reference is made for a detailed description of the arrangement and mode of operation of the rolls and their driving mechanism.

The invention embodied in the present application relates to an improvement which is especially applicable to said mill, but is not limited thereto, since by mechanical changes within the power of the skilled mechanic it may be used in connection with rolls differently constructed and arranged. It is designed to remedy a practical difficulty experienced generally in the use of the vertical rolls, of guiding the metal in the different stages of its reductions and of obtaining in a universal mill all those advantages in uniformity and regularity of product which hitherto have been obtainable only in the use of horizontal rolls provided with peripheral collars or with guides of the usual form.

By use of my improvement I am enabled to roll material of uniform cross-section throughout, whatever be its sectional area within the limits of capacity of the mill; and although the particular apparatus shown by me is adapted especially for rolling pieces of rectangular cross-section, other shapes may be produced by proper modifications in form of the parts. As before intimated, such results have been hard to obtain in the use of mills of the sort heretofore known, since from various causes—such as lack of uniformity in heat of the metal or curling at the end—the piece is apt to rise at one side in the vertical rolls and to descend at the other, so that instead of a uniform rectangular product there may be produced a piece of general diamond shape in cross-section and of varying sectional shapes at different places.

Referring now to the drawings, 2 2 are the horizontal rolls, 3 the housings thereof, and 4 4 their adjusting-screws.

5 5 are the vertical rolls, which are situate between upright housings 6; and 7 7 are parallel rest-bars which extend horizontally in pairs between the housings at the top and bottom thereof, and serve as braces or separators for the housings and as guides or rests for the carriers and bearings of the vertical rolls. Said bearings 8 encircle the necks of the rolls, and are movably set between the rest-bars, the top and bottom bearings of each roll being connected or tied together by strong vertical plates or carriers 9. The rolls are driven from a suitable reversing-engine by power-driven shafts 10 and 11, journaled in suitable bearings at the top and base of the housings and connected respectively with gear-wheels 13 on the upper neck of one roll and the lower neck of the other by sliding pinions 12, mounted on the shafts by feather-and-spline connections, so that the gearing of the rolls shall not be disturbed by the lateral adjustment. Such adjustment is effected by means of adjusting-screws 14 and a hydraulic retracting plunger 15. (Shown in Figs. 2 and 4.)

16 16 are the usual feed-rollers, which extend between and beyond the vertical and horizontal rolls, and 17 are guide-bars connected at one end with the carriers of the vertical rolls and at the other end provided with adjusting-screws 18, by which they are movable laterally in the adjustment of the rolls for the purpose of guiding the metal piece from one set of rolls to the next.

In the practical operation of a mill constructed as just described the metal piece to be reduced is passed back and forth between both horizontal and vertical rolls, the former of which effect its reduction in a vertical direction while the latter reduce it laterally, and by properly adjusting the members of each pair of rolls toward each other it may be brought to the desired cross-sectional dimensions. It is in such reduction that the metal is apt to be canted to one side or the other, and to be subjected to uniform shaping, as I have above indicated. To prevent this I employ in connection with the vertical rolls interposed guides above and below the metal piece, which are preferably adjustable conformably to the adjustment of the rolls, and which serve to direct the metal in its proper course, preventing it from turning laterally in either direction.

I shall now describe the construction of guide-bars shown in Figs. 1 to 5, inclusive.

19 19 are horizontal bars which are set parallel to each other between the bases of the vertical rolls, and are secured to the bearings thereof by bolts passing through flanges of the bars, as shown in Figs. 4 and 5. These bars I shall designate as "the lower guide-bars." Their function is to serve as supports for the metal piece, and as they move with the bearings of the vertical rolls they perform this function in every position of the latter. Their relation to and manner of co-operation with the upper guides will be explained hereinafter; but independently of such combination they are new in themselves, and although very useful in combination with the upper guides they may be dispensed with and other suitable non-adjustable supports substituted therefor, as will be understood.

The upper guides are supported from vertical strain by means of vertically-adjustable horizontal guide rests or bars 20 20—one on each side of the vertical rolls—which extend between the housings and are connected at the middle by a bolt 45 and an encircling tubular separator 46. At their ends the guide-rests are fitted in vertical slides at the inner sides of the housings. Said slides are shown in detail in Figs. 6 and 7, and are constructed as follows: A vertical metal plate 21 is bolted against the inner side of each housing, and is formed with suitable vertical guide flanges or shoulders b. The ends of the guide-rests fit against the faces of these vertical plates, and their inner lateral extremities fit against the shoulders or flanges b, while their outer sides are confined by means of vertical bars or strips 22, set at the ends of the plates 21, and connected by means of a series of bolts 23, which extend from one strip to the next through the plate. The strips 22 and the shoulders b on the plates 21 therefore serve as vertical slides, within which the ends of the guide-rests are vertically movable. Such vertical movement is effected by the adjusting mechanism shown in Figs. 4 and 5. At each end of each guide-rest is arranged a vertical screw 24, whose lower end is stepped in an externally-spherical bearing 25, which is set in a correspondingly-shaped socket-plate 26, bolted to the rest-bar 7, and the upper end of each screw passes through an externally-spherical nut 27, set in a correspondingly-shaped socket in the guide-rest and held therein by a follower or cap-plate 28, the nut being prevented from rotation on its vertical axis (though free to turn otherwise) by a pin 29. The upper end of the screw bears upon the stationary rest 7, and the strain of the upper guides is exerted thereon, which, therefore, takes up the entire strain of the guides in the work of the mill. Each screw is rotated by means of gearing, consisting of a gear-wheel 30 at the foot of the screw, a gear-wheel 31 on a horizontal shaft 32, which has its bearings in the housings, and gear-wheels 33 on the exterior of the housings, connecting the shaft 32 with a shaft 34. There are two of the shafts 34—one at each end of the housings—and each is connected, by pinions 35, short vertical shafts 36, and pinions 37, with a common counter-shaft 38, which is driven, preferably, by a suitable reversing-engine. The vertical shafts 36 are held in place by sectional sleeves 39, connected by braces 40 with similar sleeves 41 on shaft 38. By driving the shaft 38 the four adjusting-screws 24 will be rotated simultaneously and to the same extent, and by turning in the nuts 27 will lift or lower the guide-rests accordingly as they are turned in one direction or the other. The function of the spherical nuts and of the spherical steps at the ends of the screws is to enable the latter to adjust themselves under the flexion and change of position to which they may be subjected in the severe strains put on the guide-rests in the work of the mill and in the expansion of the guide-rest caused by their proximity to the heated metal. The preferable shape of the guide-rests, by which they are braced and strengthened, and the manner in which they are enabled in their most elevated position to enter a cored-out portion of the rest-bars 7, is clearly illustrated in Figs. 3 and 4.

The upper guides are shown in Figs. 2, 3, 8, 9, and 10. There are two such guides adjacent to each of the vertical rolls. Each consists of a block or casting 42, situate on the inner side of the roll and connected by bolts 43 to two chucks 44, which fit against the inner sides of the guide-rests or guide-bars 20 and are guided and held by horizontal planed slides or seats c thereon, as shown in Fig. 9, on which they are capable of free horizontal movement. The outer end of each chuck is provided with vertical flanges or shoulders $d$, which inclose the sides of the vertical carriers 9 of the rolls, as shown in Fig. 8, and which enable the chucks to move vertically on said carriers, following the guide-rests in their vertical adjustment. The guides are provided at their ends with tongues or shoulders which fit against the under sides of the slides $c$, so that in use the upward thrust is transferred directly to the guide-rests, but they are preferably unsupported, except by the bolts 43, so that by loosening these bolts they may be removed and others substituted therefor to adapt the mill to be used in rolling pieces of different width. In order to cause the metal in passing the rolls to bear directly on the guides, their lower sides should be constructed, as shown in Figs. 3 and 9, so as to project somewhat below the level of the base of the guide-rests.

As will be seen by reference to the drawings, the upper guides have a functional relation to the rolls similar to that of the usual collars on rolls, so that the metal in passing between the rolls cannot rise above the base of the guides, and if by proper adjustment they are maintained in such position as to engage the surface of the metal piece the latter will be confined, as in a box, between the upper and lower guides and cannot turn laterally between the rolls. The lateral adjustment of the guides is performed automatically in the lateral adjustment of the vertical rolls, whose carriers 9 move the chucks and the connected guides horizontally along the seats of the chucks on the guide-rests, and their vertical adjustment is performed by the adjusting-screws 24, by means of which the guide-rests 20 are movable vertically in either direction, thereby causing the chucks to slide correspondingly on their bearings on the vertical carriers and to carry the guides with them. In this manner the guides may be adjusted vertically to conform to the diminishing thickness of the metal as it is acted upon by the horizontal rolls and to confine and direct the metal in every stage of its reduction.

It sometimes happens that in rolling metal in the mill its end curls up between the horizontal and vertical rolls and will not enter the latter properly. To prevent this and to guide the metal vertically in its intermediate passage from one set of rolls to the other, I employ a top guide bar or plate 47, which is preferably arranged as follows: One end of the plate is pivotally connected to that one of the guide-rests 20 next to the horizontal rolls by a bolt 48 passing through lugs 49, formed on the guide-bar, Figs. 1, 2, and 3, and the other end is pivotally bolted to the lower end of a hanger-bar 50, the upper end of which is pivotally connected to a bar 51, which extends across the housings of the horizontal rolls, between the bearings of the upper roll and the adjusting-screws, and which moves with said bearings in their vertical adjustment, thus serving in this relation the function of an adjustable guide-rest. This guide is, therefore, in effect a jointed plate, one end of which will move with the vertical adjustment of the guide-rests of the vertical rolls, while the other end will move with the adjustment of the horizontal rolls, thus preserving in any position of either a constant relation thereto, and affording a guide or guard which prevents the metal from curling up at the end on its exit from the horizontal rolls and directs it in proper position into the bite of the vertical rolls. Other means of arranging and supporting this part of the apparatus may be devised within the scope of my invention. It is of marked utility, and I desire to claim it broadly.

My invention may be varied in many ways in form and details of construction by those skilled in the art. For example, in Fig. 11 I show a modified form of upper guide for the vertical rolls possessing the same capacity for vertical adjustment as that above described, but without capacity for lateral adjustment. In this case the guide is constituted by a plate 52, pivotally connected at one end to the end of the hanger 50, and extending thence between the vertical rolls to the rear guide-rest 20, on which it is hung, as clearly shown in the drawings. When thus arranged it is evident that the guide will rise or fall with the vertical movement of the guide-rest, and will therefore serve as an upper guide to the metal in every stage of its reduction.

In Figs. 12 and 13 I illustrate another modified construction of the upper guides in which the vertically-movable guide-rests 20 themselves serve as guides, being preferably faced for this purpose with face plates or bars 20', secured thereto, as shown in the drawings. The proximity of these guides to the vertical rolls causes them to engage and to guide the metal as it passes between the latter. In these figures I also show a modified construction of the lower guides, in which the guides 19 are replaced by cross guide-bars 19' set on both sides of the rolls and bolted to the lower rest-bars 7.

I claim—

1. The combination, with laterally-adjustable vertical rolls, of laterally-adjustable guides situate at or near the bases of the rolls and adapted to serve as supports or guides for the metal while passing between said rolls, substantially as and for the purposes described.

2. The combination, with laterally-adjustable vertical rolls and their bearings, of guides attached to and movable with the bearings at the lower ends of the rolls and situate on the inner sides thereof, said guides being adapted to support or guide the metal while passing between the rolls, substantially as and for the purposes described.

3. The combination, with the vertical rolls, of an interposed guide situate above the path of the metal, substantially as and for the purposes described.

4. The combination, with the vertical rolls, of a vertically-adjustable guide situate above the path of the metal, for the purpose of guiding the metal in its passage through the rolls, substantially as described.

5. The combination, with the laterally-adjustable vertical rolls, of laterally-adjustable guides situate above the path of the metal, for the purpose of guiding the metal in its passage through the rolls, substantially as described.

6. The combination, with laterally-adjustable vertical rolls, of laterally and vertically adjustable guides situate above the path of the metal, substantially as and for the purposes described.

7. The combination, with laterally-adjustable vertical rolls, of interposed laterally and vertically adjustable guides situate above the path of the metal, substantially as and for the purposes described.

8. The combination, with the vertical rolls and the horizontal rolls, of a guide interposed between the said rolls above the path of the metal, substantially as and for the purposes described.

9. The combination, with the vertical rolls and their housings and the horizontal rolls and their housings, of a jointed guide interposed between the said housings above the path of the metal, and vertically-adjustable guide-rests in the said housings, to which the guide is connected, to permit free vertical adjustment thereof, substantially as and for the purposes described.

10. The combination, with the vertical rolls and their housings, of vertically-movable guide-rests set in slideways in the housings, and mechanism by which they are vertically adjustable, substantially as and for the purposes described.

11. In adjusting mechanism for rolls, an adjusting-screw having a spherical nut set in a correspondingly-shaped socket, substantially as and for the purposes described.

12. The combination, with the vertically-adjustable guide-rests, of adjusting-screws, spherical nuts on the guide-rests, through which the screws pass, spherical steps for the screws, and driving-gear therefor, substantially as and for the purposes described.

13. The combination, with the vertically-adjustable guide-rests, of adjusting-screws, spherical nuts on the guide-rests, through which the screws pass, and driving-gear therefor, substantially as and for the purposes described.

14. The combination, with the vertical roll-housings and the guide-bar, of slide-plates at the inner sides of the housings, having vertical seats against which the ends of the guide-bar fit, and removable end strips or bars bolted to the plates and confining the guide-bar, substantially as and for the purposes described.

15. The combination, with the guide-rests and the vertical roll-carriers, of chucks movably mounted in longitudinal seats on the guide-rests at opposite sides of the rolls and secured to said roll-carriers, and guides bolted to the chucks and situate on the inner sides of the rolls, substantially as and for the purposes described.

16. The combination, with the guide-rests, of chucks movably mounted in longitudinal seats on the guide-bars at opposite sides of the rolls, and guides bolted to the chucks, substantially as and for the purposes described.

17. The combination, with the guide-rests, of chucks movably mounted in longitudinal seats on the guide-bars at opposite sides of the rolls, and guides bolted to the chucks, said guides being shouldered and bearing against the lower sides of the rest-bars, substantially as and for the purposes described.

18. The combination, with the vertical roll-housings, of guide-rests situate on opposite sides of the rolls, set in slideways in the housings, in which they are vertically adjustable, and a bolt or brace connecting the rest-bars, substantially as and for the purposes described.

19. The combination, with the vertical roll-housings, of vertically-adjustable guide-bars set therein, and guides connected with the carriers of the vertical rolls and supported on the guide-bars, against which they bear to transmit thereto upward vertical strains to which they may be subjected, substantially as and for the purposes described.

20. The combination, with the vertically-adjustable guide-bars and stationary rest-bars, of adjusting-screws connected with the guide-bars for moving them, and bearing on the rest-bars, substantially as and for the purposes described.

21. The combination, with the vertical rolls, their housings, and the guide-rests and the horizontal rolls, their housings, and a guide-rest secured to the bearings of the rolls, of a guide plate or bar 47, pivotally secured to the guide-rest of the vertical rolls, and a bar or link connecting the same with the guide-rests of the horizontal rolls, substantially as and for the purposes described.

In testimony whereof I have hereunto set my hand this 15th day of October, A. D. 1889.

HENRY AIKEN.

Witnesses:
W. B. CORWIN,
JNO. K. SMITH.